Nov. 8, 1966   P. BECKMAN   3,283,397
FLATTENING AND REVERSIBLY BENDING METHOD
OF MAKING A THERMOCOUPLE
Original Filed April 7, 1961

INVENTOR
Paul Beckman
BY
ATTORNEY

United States Patent Office 3,283,397
Patented Nov. 8, 1966

3,283,397
FLATTENING AND REVERSIBLY BENDING
METHOD OF MAKING A THERMOCOUPLE
Paul Beckman, 944 Henrietta Ave., Huntington Valley, Pa.
Continuation of application Ser. No. 110,676, Apr. 7,
1961. This application May 26, 1965, Ser. No. 462,471
1 Claim. (Cl. 29—155.5)

This application is a continuation of my copending application Serial No. 110,676, filed April 7, 1961 and now abandoned.

This invention relates to thermocouples.

While thermocouples are an extremely old art, yet the constructions heretofore used have been relatively large so that they have not been adapted for maximum effective use in many applications. Accordingly, it is an object of my invention to provide an improved thermocouple that can be constructed in a micro-miniature size. Another object is to provide an improved thermocouple of micro-miniature size whose construction is relatively simple and economical while still retaining a high degree of accuracy and response.

Other objects and advantages will be more apparent to those skilled in the art from the accompanying drawings in which.

Figure 1:
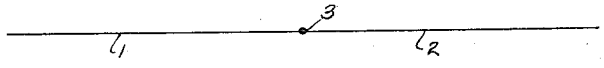
FIG. 1 shows the two wires connected at their junction point.
Figure 2:
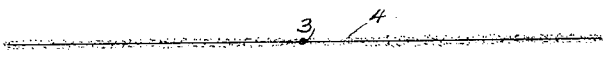
FIG. 2 shows such wires with an electrical insulation coating.
Figure 3:
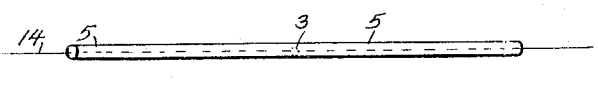
FIG. 3 shows a tube with the wire disposed therein.
Figure 4:
FIG. 4 shows the tube swaged flat on the junction point.
Figure 5:
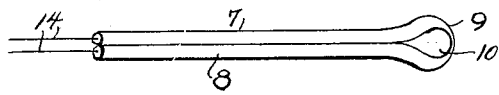
FIG. 5 shows the tube bent at the junction point to form the probe.
Figure 6:
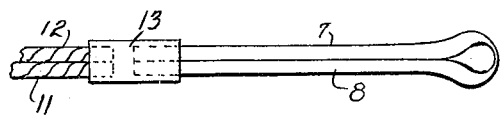
FIG. 6 shows the external leads connected to the thermocouple.

In the particular embodiment of the invention disclosed herein, I have shown in FIG. 1 a wire 1, preferably of tungsten, and a wire 2, preferably of iridium or rhenium, connected at a junction point 3 as by a suitable fusion weld. The wires 1 and 2 are preferably about .001″ in diameter. The wire is then coated with electrical insulation 4 preferably by a vacuum deposit of thorium oxide, this coating being about .002″ in diameter. The combined wires are then inserted into a tube 5 preferably of tantalum and of about .008″ outside diameter and .004″ inside diameter, the junction point being disposed about midway of the length of the tube. The tube is then swaged flat as at 6 on to the junction point and then reversely bent on itself as shown in FIG. 5 so that the tube portions 7 and 8 of the tube lie parallel to each other with the swaged portion in the form of a relatively large curve 9, having a space 10. It will be understood that even though the figures are greatly enlarged and thus show what appears to be a relatively large end 9, yet in actual practice this construction is highly conducive to allowing the tube at end 9 to be made of extremely small size so as to produce what I call "micro-miniature" size. The outer end of the tube portions 7 and 8 are then connected to cables 11 and 12 by a ferrule 13, it being understood that the thermocouple wires 1 and 2 extend beyond the ends of the tube as indicated at 14 for connection to the lead wires 11 and 12.

From the foregoing disclosure it is seen that I have provided an improved thermocouple construction that lends itself to extremely small micro-miniaturization, and yet retain all of the accuracy and sensitivity as might be found in larger constructions.

It will, of course, be understood that various changes in details of construction and arrangement of parts may be made by those skilled in the art without departing from the spirit of the invention as set forth in the appended claim.

I claim:

The method of making a miniature thermocouple which comprises serially joining two thermocouple wires of different compositions end to end to produce a thermocouple junction intermediate the ends of the joined wire, coating the joined thermocouple wires with electrical insulation material, inserting the coated thermocouple wires into an elongated tubular metallic member having an internal diameter in excess of the external diameter of the coated thermocouple wires, flattening a relatively small portion of the tubular member intermediate its ends at the site of the thermocouple junction to rigidly engage the coated wires at that site, and reversibly bending the tubular member on itself at the site of the flattened portion and thereby bringing the two end portions of the tubular member into parallel adjoining relationship with one another while curving the flattened portion inside and outside to provide an open space inside of the flattened portion.

References Cited by the Examiner
UNITED STATES PATENTS

| 2,805,272 | 9/1957 | Postal | 136—4 |
| 2,927,150 | 3/1960 | Arnigh et al. | |
| 3,065,286 | 11/1962 | Connell | 136—4 |

WINSTON A. DOUGLAS, *Primary Examiner.*

A. BEKELMAN, *Assistant Examiner.*